United States Patent
Hosseini et al.

(10) Patent No.: US 10,455,603 B2
(45) Date of Patent: Oct. 22, 2019

(54) WIRELESS TRANSMISSION TIMING BASED ON TIMING ADVANCE VALUES IN SHORTENED TRANSMISSION TIME INTERVAL TRANSMISSIONS

(71) Applicant: QUALCOMM Incorporated, San Diego, CA (US)

(72) Inventors: Seyedkianoush Hosseini, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/832,392

(22) Filed: Dec. 5, 2017

(65) Prior Publication Data

US 2018/0160440 A1   Jun. 7, 2018

Related U.S. Application Data

(60) Provisional application No. 62/430,880, filed on Dec. 6, 2016.

(51) Int. Cl.
*H04L 1/18*   (2006.01)
*H04L 5/00*   (2006.01)
(Continued)

(52) U.S. Cl.
CPC ....... *H04W 72/1226* (2013.01); *H04L 1/1825* (2013.01); *H04L 1/1854* (2013.01);
(Continued)

(58) Field of Classification Search
CPC ............. H04W 72/0446; H04W 72/10; H04W 72/1268; H04W 72/14; H04W 72/1284
See application file for complete search history.

(56) References Cited

U.S. PATENT DOCUMENTS 9,591,631 B2 * 3/2017 You .................... H04L 5/001
10,128,996 B2 * 11/2018 Seo ..................... H04W 76/14
(Continued)

FOREIGN PATENT DOCUMENTS

| WO | WO-2016126027 A1 | 8/2016 |
| WO | WO2017153464 A1 | 9/2017 |
| WO | WO2017172538 A1 | 10/2017 |

OTHER PUBLICATIONS

ZTE: "Considerations on the Future eV2X Study", RP-170387, 3GPP TSG RAN #75, Dubrovnik, Croatia, Mar. 6-9, 2017, pp. 1-6.
(Continued)

*Primary Examiner* — Diane D Mizrahi
(74) *Attorney, Agent, or Firm* — Holland & Hart LLP

(57) ABSTRACT

Wireless transmission timing based on timing advance (TA) values in shortened transmission time interval (sTTI) transmissions are provided. A TA value associated with one or more component carriers (CCs) for a wireless transmission may be identified, a TA threshold value may be identified, and one or more parameters associated with the wireless transmission may be set at a first value when the TA value is below the TA threshold value and set at a second value with the TA value is above the TA threshold value. The one or more parameters may include a timing for feedback transmission according to a hybrid acknowledgement repeat request (HARQ) process associated with the wireless transmission, and the timing for the feedback transmission may be increased in the event that the TA value is above the TA threshold value.

38 Claims, 15 Drawing Sheets

(51) Int. Cl.
*H04W 56/00* (2009.01)
*H04W 72/12* (2009.01)

(52) U.S. Cl.
CPC ............ *H04L 1/1887* (2013.01); *H04L 5/001* (2013.01); *H04L 5/0078* (2013.01); *H04W 56/0045* (2013.01); *H04W 72/1263* (2013.01); *H04W 72/1289* (2013.01); *H04L 1/1812* (2013.01)

(56) References Cited

U.S. PATENT DOCUMENTS

| | | | |
|---|---|---|---|
| 2013/0195084 A1 | 8/2013 | Chen et al. | |
| 2013/0242729 A1 | 9/2013 | Chen et al. | |
| 2013/0258958 A1* | 10/2013 | Dinan | H04W 56/0045 370/329 |
| 2014/0161111 A1* | 6/2014 | Kim | H04W 56/0005 370/336 |
| 2015/0124787 A1* | 5/2015 | Dinan | H04W 56/00 370/336 |
| 2015/0156798 A1 | 6/2015 | Jiang et al. | |
| 2015/0249972 A1* | 9/2015 | You | H04L 5/001 370/254 |
| 2016/0323070 A1 | 11/2016 | Chen et al. | |
| 2017/0181182 A1 | 6/2017 | Patel et al. | |
| 2017/0331670 A1* | 11/2017 | Parkvall | H04W 52/0274 |

OTHER PUBLICATIONS

International Search Report and Written Opinion—PCT/US2017/064907 ISA/EPO—dated Mar. 19, 2018.
LG Electronics: "Discussion on TBS Restriction and UE Behaviour", 3GPP Draft; R1-124329 TBS Restriction and UE Behaviour Vfinal, 3rd Generation Partnership Project (3GPP), Mobile Competence Centre, 650, Route Des Lucioles, F-06921 Sophia-Antipolis Cedex, France, vol. RAN WG1, No. San Diego, USA; Oct. 8, 2012-Oct. 12, 2012 Sep. 29, 2012, XP050662227, Retrieved from the Internet: URL:http://www.3gpp.org/ftp/tsg_ran/WG1_RL1/TSGR1_70b/Docs/ [retrieved on Sep. 29, 2012], 2 pages.

* cited by examiner

WIRELESS TRANSMISSION TIMING BASED ON TIMING ADVANCE VALUES IN SHORTENED TRANSMISSION TIME INTERVAL TRANSMISSIONS

CROSS REFERENCES

The present Application for Patent claims priority to U.S. Provisional Patent Application No. 62/430,880 by Hosseini, et al., entitled "Wireless Transmission Timing Based On Timing Advance Values In Shortened Transmission Time Interval Transmissions," filed Dec. 6, 2016, assigned to the assignee hereof.

BACKGROUND

The following relates generally to wireless communication, and more specifically to wireless transmission timing based on timing advance values in shortened transmission time interval transmissions.

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some examples, a wireless multiple-access communication system may include a number of base stations, each simultaneously supporting communication for multiple communication devices, otherwise known as user equipment (UEs). In a LTE or LTE-Advanced (LTE-A) network, a set of one or more base stations may define an eNodeB (eNB). In other examples (e.g., in a next generation new radio (NR) or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). A base station may communicate with a set of UEs on downlink (DL) channels (e.g., for transmissions from a base station to a UE) and uplink (UL) channels (e.g., for transmissions from a UE to a base station).

A base station in some LTE or NR deployments may transmit to one or more UEs using different length transmission time intervals (TTI) that may be reduced in length relative to legacy LTE TTIs. Such a reduced length TTI may be referred to as a shortened TTI (sTTI) and users communicating using sTTIs may be referred to as low latency users. An sTTI may be a subset of one or more subframes that correspond to legacy TTI subframes. A base station may allocate transmission resources for sTTIs to a UE that may include time resources, frequency resources, and one or more component carriers (CCs) to be used for sTTI transmissions. UEs operating in a network may use timing advance (TA) values to adjust uplink transmission times so as to provide synchronized uplink receptions at a base station that compensate for a propagation delay of the uplink transmissions. When transmitting using sTTIs, the TA value may be a relatively larger portion of a TTI duration compared with transmissions that may use legacy LTE TTI durations.

SUMMARY

The described techniques relate to improved methods, systems, devices, or apparatuses that support wireless transmission timing based on timing advance values in shortened transmission time interval transmissions. Generally, the described techniques provide for identifying a timing advance (TA) value associated with one or more component carriers (CCs) for a wireless transmission, identifying a TA threshold value, and setting one or more parameters associated with the wireless transmission at a first value when the TA value is below the TA threshold value and at a second value with the TA value is above the TA threshold value. For example, a parameter may be a timing for feedback transmission according to a hybrid acknowledgement repeat request (HARQ) process associated with the wireless transmission, and the timing for the feedback transmission may be increased in the event that the TA value is above the TA threshold value.

In some cases, the TA threshold value may be identified based at least in part on a transmission time interval (TTI) duration of the wireless transmission. In some examples, if the TTI duration is a shortened TTI (sTTI), the TA threshold value may be set to provide sufficient processing time for a UE to generate feedback information within the feedback transmission timing, and if the TA value exceeds the TA threshold value, the feedback transmission timing may be set to provide additional time. In some cases, the TA value may be identified based on two or more TA values for two or more component carriers (CCs), and the one or more parameters set based on individual TA values per CC, a maximum TA value of the two or more CCs, a timing mismatch value associated with the CCs, or any combination thereof. In some examples, the TA value be associated with a physical uplink control channel (PUCCH) group configuration or a TA group (TAG) configuration, in which two or more CCs may belong to a PUCCH group or TAG. In some examples, the one or more parameters associated with the wireless transmission may include a HARQ feedback timing parameter, a transport block size (TBS) scaling parameter, a number of supported spatial transmission layers, a channel quality information (CQI) type reporting, a timing for uplink transmission scheduling, or any combination thereof.

A method of wireless communication is described. The method may include identifying a TA value associated with a wireless transmission, identifying a TA threshold value based at least in part on a TTI of the wireless transmission, and setting one or more parameters associated with the wireless transmission based at least in part on the TA value and the TA threshold value.

An apparatus for wireless communication is described. The apparatus may include means for identifying a TA value associated with a wireless transmission, means for identifying a TA threshold value based at least in part on a TTI of the wireless transmission, and means for setting one or more parameters associated with the wireless transmission based at least in part on the TA value and the TA threshold value.

Another apparatus for wireless communication is described. The apparatus may include a processor, memory in electronic communication with the processor, and instructions stored in the memory. The instructions may be operable to cause the processor to identify a TA value associated with a wireless transmission, identify a TA threshold value based at least in part on a TTI of the wireless transmission, and set one or more parameters associated with the wireless transmission based at least in part on the TA value and the TA threshold value.

A non-transitory computer readable medium for wireless communication is described. The non-transitory computer-readable medium may include instructions operable to cause a processor to identify a TA value associated with a wireless transmission, identify a TA threshold value based at least in part on a TTI of the wireless transmission, and set one or more parameters associated with the wireless transmission based at least in part on the TA value and the TA threshold value.

Some examples of the method, apparatus, and non-transitory computer-readable medium described above may further include processes, features, means, or instructions for identifying two or more CCs for the wireless transmission, and wherein the TA value may be common across each of the two or more CCs and is based on one or more of an individual TA for each CC, an uplink time misalignment value for the two or more CCs, or a downlink time misalignment value for the two or more CCs.

In some examples of the method, apparatus, and non-transitory computer-readable medium described above, the setting the one or more parameters comprises setting a feedback timing for indicating successful reception of a downlink transmission based at least in part on the TA value and the TA threshold value.

Some examples of the method, apparatus, and non-transitory computer-readable medium described above may further include processes, features, means, or instructions for identifying two or more TA groups, and wherein the TA value comprises a TA value for each TA group.

In some examples of the method, apparatus, and non-transitory computer-readable medium described above, the identifying the TA threshold value comprises identifying the TA threshold value as a first TA threshold when the TTI of the wireless transmission may be a two-symbol TTI, and identifying the TA threshold value as a second TA threshold when the TTI of the wireless transmission may be a one-slot TTI or a 1 ms TTI. The second TA threshold may or may not be the same for 1-slot and 1 ms TTIs.

In some examples of the method, apparatus, and non-transitory computer-readable medium described above, the one or more parameters comprise a HARQ feedback timing parameter that may be set based at least in part on TA values for two or more component carriers. Some examples of the method, apparatus, and non-transitory computer-readable medium described above may further include processes, features, means, or instructions for reporting the TA value to a base station, wherein the TA value corresponds to a TA value based on two or more component carriers for the wireless transmission. In some examples of the method, apparatus, and non-transitory computer-readable medium described above, the TA threshold value may be identified for each CC of a plurality of CCs for the wireless transmission.

In some examples of the method, apparatus, and non-transitory computer-readable medium described above, the one or more parameters comprise one or more of a HARQ feedback timing parameter, a transport block size scaling parameter, a number of supported spatial transmission layers, a CQI type reporting, or a timing for uplink transmission scheduling.

In some examples of the method, apparatus, and non-transitory computer-readable medium described above, the TA threshold value may be identified for each CC of a plurality of CCs for the wireless transmission. In some examples of the method, apparatus, and non-transitory computer-readable medium described above, the plurality of CCs comprise one or more LTE CCs, one or more NR CCs, or combinations thereof. In some examples of the method, apparatus, and non-transitory computer-readable medium described above, the TA threshold value may be identified for each of two or more uplink control channel groups of CCs for the wireless transmission. In some examples of the method, apparatus, and non-transitory computer-readable medium described above, each group of CCs may be part of a carrier aggregation group or a dual-connectivity group.

In some examples of the method, apparatus, and non-transitory computer-readable medium described above, the one or more parameters may be provided from a base station to a user equipment for use when transmitting the wireless transmission. In some examples of the method, apparatus, and non-transitory computer-readable medium described above, the one or more parameters may be set by a UE based on receiving the one or more parameters from a base station for use when transmitting the wireless transmission.

In some examples of the method, apparatus, and non-transitory computer-readable medium described above, the setting the one or more parameters comprises determining a maximum number of component carriers (CCs) per physical uplink control channel (PUCCH) group. In some examples of the method, apparatus, and non-transitory computer-readable medium described above, the TA value is based at least in part on a time gap between an earliest uplink carrier and a latest downlink carrier of a component carrier. In some examples of the method, apparatus, and non-transitory computer-readable medium described above, the time gap is less than the TA threshold value.

DETAILED DESCRIPTION

Figure 1:
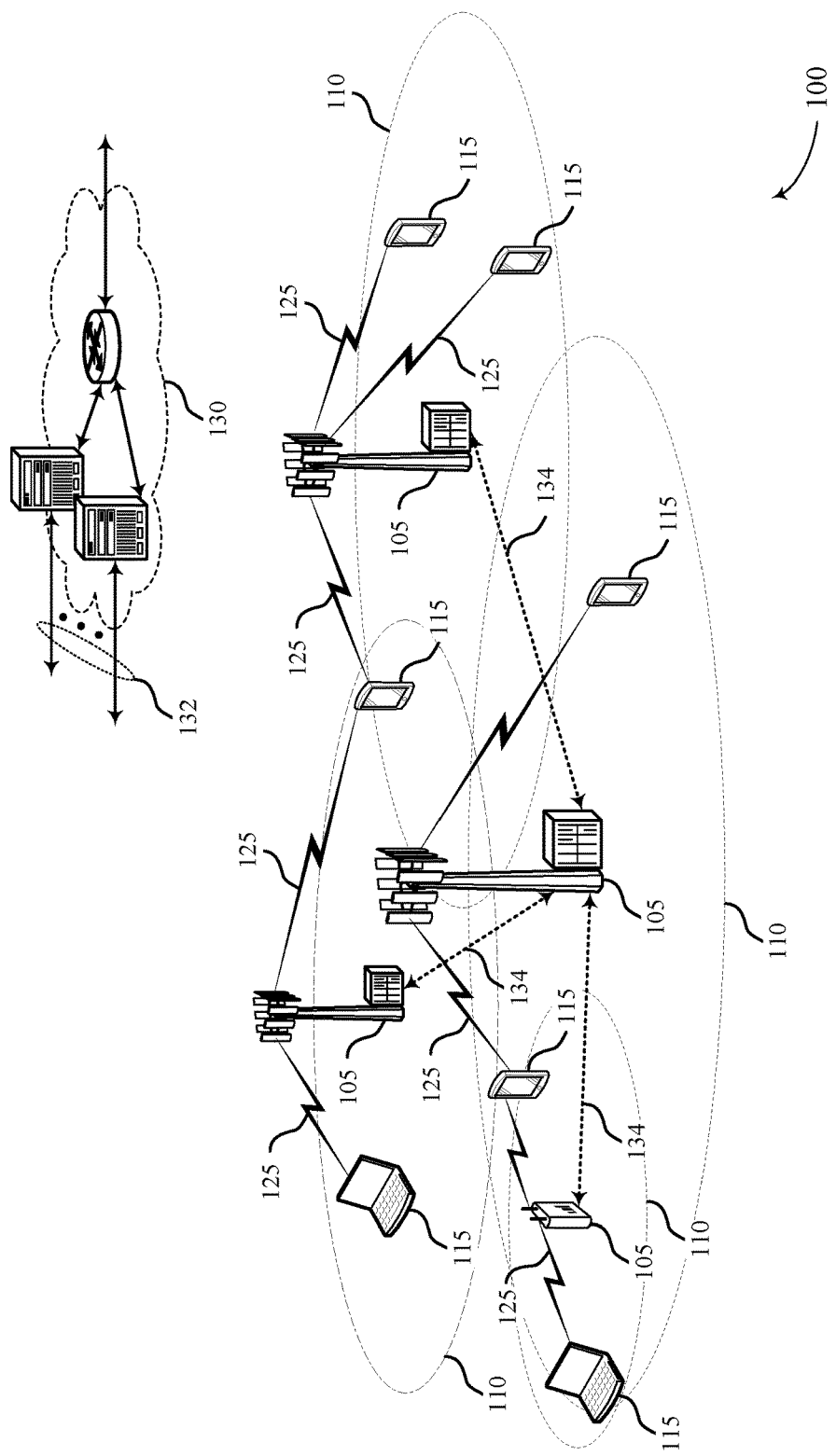
FIG. 1 illustrates an example of a system for wireless communication that supports wireless transmission timing based on timing advance values in shortened transmission time interval transmissions in accordance with aspects of the present disclosure.

The described techniques relate to improved methods, systems, devices, or apparatuses that support wireless transmission timing based on timing advance values in shortened transmission time interval (sTTI) transmissions. Resources allocated for sTTI transmissions may be used for uplink and downlink communications that are latency sensitive (referred to as low latency communications) relative to communications such as enhanced mobile broadband (eMBB) transmissions that may use a 1 ms (or legacy LTE) TTI duration. In some cases, a sTTI duration may correspond to one slot of a wireless subframe, or to two or three orthogonal frequency division multiplexing (OFDM) symbols, for example, and a 1 ms TTI duration may correspond to a duration of a 1 ms subframe.

Such low latency communications may be used in systems, for example, that may support multiple different services for data communications. Such different services may be selected depending upon the nature of the communications. For example, communications that require low latency and high reliability, sometimes referred to as mission critical (MiCr) communications, may be served through a lower-latency service (e.g., an ultra-reliable low-latency communication (URLLC) service) that uses sTTIs. Correspondingly, communications that are more delay-tolerant may be served through a service that provides relatively higher throughput with somewhat higher latency, such as a mobile broadband service (e.g., an eMBB service) that uses 1 ms TTIs. In other examples, communications may be with UEs that are incorporated into other devices (e.g., meters, vehicles, appliances, machinery, etc.), and a machine-type communication (MTC) service (e.g., massive MTC (mMTC)) may be used for such communications. In some cases, different services (e.g., eMBB, URLLC, mMTC) may have different TTIs, different sub-carrier (or tone) spacing, and different cyclic prefixes.

The present disclosure describes various techniques with reference to next generation networks (e.g., 5G or NR networks) that are being designed to support features such as high bandwidth operations, more dynamic subframe/slot types, and self-contained subframe/slot types (in which HARQ feedback for a subframe/slot may be transmitted before the end of the subframe/slot). However, such techniques may be used for any system in which TTIs of different lengths may be transmitted in a wireless communications system.

The described techniques provided in various examples provide for identifying a timing advance (TA) value associated with one or more component carriers (CCs) for a wireless transmission, identifying a TA threshold value, and setting one or more parameters associated with the wireless transmission at a first value when the TA value is below the TA threshold value and at a second value with the TA value is above the TA threshold value. For example, a parameter may be a timing for feedback transmission according to a hybrid acknowledgement repeat request (HARQ) process associated with the wireless transmission, and the timing for the feedback transmission may be increased in the event that the TA value is above the TA threshold value.

In some cases, the TA threshold value may be identified based at least in part on a TTI duration of the wireless transmission. In some examples, if the wireless transmission uses a sTTI duration, the TA threshold value may be set to provide sufficient processing time for a UE to generate feedback information within the feedback transmission timing. In such cases, if the TA value exceeds the TA threshold value, the feedback transmission timing may be set to provide additional time for a UE to perform processing to generate the feedback information. In some cases, the TA value may be identified based on two or more TA values for two or more component carriers (CCs), and the one or more parameters set based on individual TA values per CC, a maximum TA value of the two or more CCs, a timing mismatch value associated with the CCs, or any combination thereof. In some examples, the TA value may be associated with a physical uplink control channel (PUCCH) group configuration or a TA group (TAG) configuration, in which two or more CCs may belong to a PUCCH group or TAG. In some examples, the one or more parameters associated with the wireless transmission may include a HARQ feedback timing parameter, a transport block size (TBS) scaling parameter, a number of supported spatial transmission layers, a channel quality information (CQI) type reporting, a timing for uplink transmission scheduling, or any combination thereof.

Aspects of the disclosure are initially described in the context of a wireless communications system. Various examples of TAs for different CCs and sTTIs are then discussed. Aspects of the disclosure are further illustrated by and described with reference to apparatus diagrams, system diagrams, and flowcharts that relate to wireless transmission timing based on timing advance values in shortened transmission time interval transmissions.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may provide for wireless transmission timing based on TA values and TA thresholds in sTTI transmissions.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one MME, at least one S-GW, and at least one P-GW. The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, Internet Protocol (IP) connectivity, and other access, routing, or mobility functions. At least some of the network devices, such as a base station 105, may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Multiple-input multiple-output (MIMO) wireless systems use a transmission scheme between a transmitter (e.g. a base station) and a receiver (e.g. a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the Physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, sTTIs, and modified control channel configuration. In some cases, an eCC may be associated with a carrier aggregation configuration or a dual connectivity (DC) configuration (e.g., when multiple serving cells serve a UE 115). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

When transmitting uplink transmissions, a UE 115 may use a timing advance (TA) value that may compensate for propagation delay between when the UE 115 starts a transmission and when a base station 105 receives the transmission. The TA value is a negative offset between the start of a received downlink TTI and a transmitted uplink TTI. This offset at the UE 115 may help to ensure that the downlink and uplink TTI transmissions are synchronized at the base station 105. A UE 115 that is located relatively far from a serving base station 105 may encounter a larger propagation delay, so its uplink transmission is started earlier than another UE 115 that is closer to the same serving base station 105. When using sTTIs, the TA value may become a relatively large portion of a sTTI duration, and may work to reduce the available processing time for a UE 115 to perform received signal processing and transmit uplink transmissions. Accordingly, in some examples, maximum TA threshold values may be set to provide a UE 115 with sufficient processing time. In some cases, if a TA value exceeds the TA threshold value, one or more parameters associated with a transmission may be adjusted to allow sufficient processing time at the UE 115.

Figure 2:
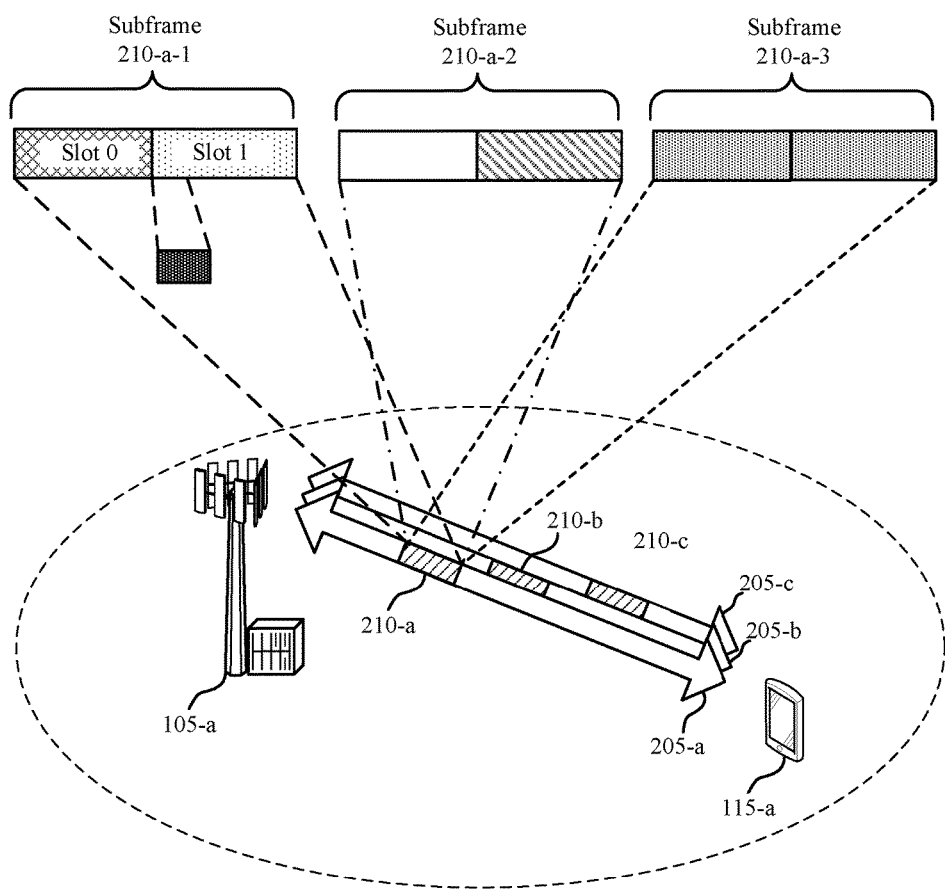
FIG. 2 illustrates an example of a wireless communications system that supports wireless transmission timing based on timing advance values in shortened transmission time interval transmissions in accordance with aspects of the present disclosure.

FIG. 2 illustrates an example of a wireless communications system 200 for wireless transmission timing based on timing advance values in shortened transmission time interval transmissions. Wireless communications system 200 includes base station 105-a and UE 115-a, which may be examples of aspects of a base station 105 and UE 115 as described above with reference to FIG. 1. In the example of FIG. 2, the wireless communications system 200 may operate according to a radio access technology (RAT) such as a 5G or NR RAT, although techniques described herein may be applied to any RAT and to systems that may concurrently use two or more different RATs.

Base station 105-a may communicate with UE 115-a over multiple component carriers (CCs) 205, including a first CC 205-a, a second CC 205-b, and a third CC 205-c. In some examples, base station 105-a may allocate resources for communication with UEs over CCs 205. For example, base station 105-a may allocate subframes 210 for communication with UE 115-a. In the example of FIG. 2, subframe 210-a may be transmitted using the first CC 205-a, subframe 210-b may be transmitted using the second CC 205-b, and subframe 210-c may be transmitted using the third CC 205-d. As indicated above, wireless communications system 200 may provide for communications using multiple TTI durations, in which one or more subframes 210 may use different TTI durations. In some examples, a subframe 210-a-1 may include two slots, namely slot0 220 and slot1 225, and a two-symbol TTI 230 may be included slot1 225. While a two-symbol TTI 230 is illustrates, sTTIs may have different symbol durations. In certain examples, a sTTI may be a slot TTI 235, such as illustrated in subframe 210-a-2, in which the sTTI corresponds to one slot of a 1 ms subframe. In other examples, a TTI may be a 1 ms TTI 240, such as illustrated in subframe 210-a-3, in which the TTI corresponds to the duration of a subframe. A 1 ms TTI 240 may also, in some cases, be referred to as a legacy TTI corresponding to a legacy LTE TTI duration.

As indicated above, in a low latency system, different sTTI lengths may be used for transmissions over CCs 205. For example, two-symbol sTTI, three-symbol sTTI, and 1-slot sTTI durations may be supported for physical uplink control channel (PUCCH) and physical uplink shared channel (PUSCH) transmissions (or shortened PUCCH (sPUCCH) and shortened PUSCH (sPUSCH) transmissions). While various examples discussed herein are described with respect to uplink communications, such techniques may also apply to downlink communications in some examples.

In some cases, sTTI durations for wireless communications may impact timing for one or more other operations at the UE 115-a or the base station 105-a. For example, HARQ processing timelines may be based on a n+k rule, where feedback for a transmission received in TTI n is provided at the first available TTI n+k where k≥4. In examples that use a two-symbol TTI, if k=4, there will be a 6-symbol gap between a received sPSDCH and HARQ ACK/NAK transmission. Further, the n+k rule may also apply for the timing between an uplink grant and a PUSCH or sPUSCH transmission. As also indicated above, the TA value for the UE 115-a may act to further reduce the timing associated with the n+k rule, thus reducing the 6-symbol gap in the example for a two-symbol sTTI. Depending on the maximum allowable TA value, the time remaining for the UE 115-a to perform processing is determined. For example, if the maximum allowable TA is Tmax, then the remaining time for processing for a two-symbol sTTI may be as low as 6*71 µs—Tmax (where 71 µs corresponds to a symbol duration).

If Tmax is a relatively large number, the UE 115-a may not have sufficient time to perform processing and generate an uplink transmission.

When the UE 115-a and base station 105-a operate using CA, the TA values may have an more pronounced impact on available processing time, because a downlink time misalignment may be allowed across different CCs of a same PUCCH group. In some cases, a time misalignment of up to 31 µs across CCs may be allowed, and can be handled at a UE 115-a. This time misalignment may further reduce the remaining processing time at the UE 115-a by up to the maximum time misalignment. Furthermore, in some cases different timing advance groups (TAGs) may be configured such that each have different uplink transmission timings. CCs within each TAG may be aligned in their uplink timing. According to various examples, one or more parameters associated with a wireless transmission may be set based on TA values and a maximum TA threshold value for TTIs having different TTI durations.

Figure 3:
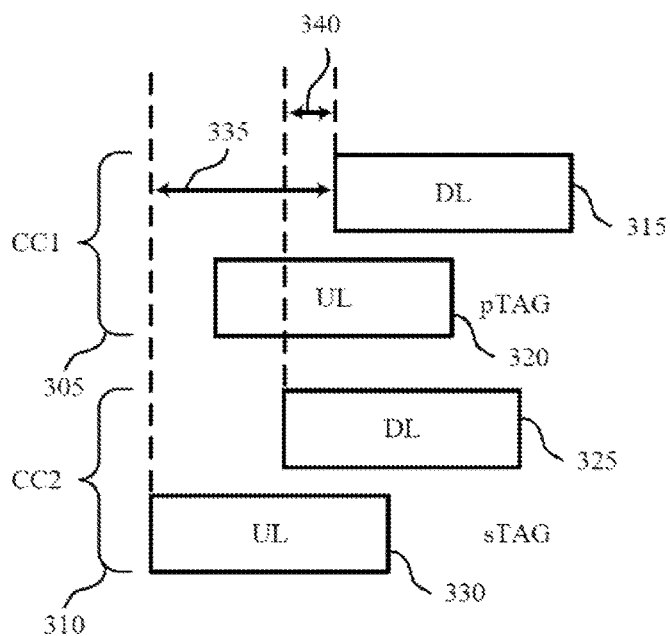
FIG. 3 illustrates an example of timing advances for multiple component carriers that support wireless transmission timing based on timing advance values in shortened transmission time interval transmissions in accordance with aspects of the present disclosure.

FIG. 3 illustrates an example 300 of a timing advances for multiple component carriers for wireless transmission timing based on timing advance values in shortened transmission time interval transmissions. Component carriers such as illustrated in FIG. 3 may be used for low latency communications between a UE and a base station such as discussed above with respect to FIGS. 1 and 2. In this example, two CCs may be configured for wireless transmissions between a UE and a base station, namely CC1 305 and CC2 310. CC1 305 may be used for downlink transmission 315 and uplink transmission 320 and may be in a primary TAG (pTAG). CC2 310 may be used for downlink transmission 325 and uplink transmission 330 and may be in a secondary TAG (sTAG). Each CC 305 and 310 may have a different TA value, and may have some amount of time misalignment.

In the example of FIG. 3, the overall time difference 335 may be defined as the time gap between the earliest uplink sTTI 330 and the latest downlink sTTI 315. Further, a time misalignment 340 may be present, which may have a maximum value (e.g., 31 µs). In cases where the value of k in the n+k rule is fixed, in order to guarantee that the remaining time for UE processing is sufficient, the total time difference Tdiff (the effective TA value) 335 should be below a specified threshold Tmax. The value of the specified threshold Tmax may depend on the relative timing across downlink cells as well as how TAGs are configured in a given carrier group (CG) (e.g., sPUCCH groups). In some cases, a base station may assume a worst case scenario and schedule UEs based on the total time difference 335 such that it is at or below the Tmax threshold. In other cases, the total time difference 330 may be above the Tmax threshold, and the value of k in the n+k rule may be adjusted when the total time difference 330 is above the Tmax threshold. For example, the value of k may be set to 4 when the total time difference 330 is at or below the Tmax threshold, and the value of k may be set to 6 (or higher) when the total time difference 330 exceeds the Tmax threshold.

Figure 4:
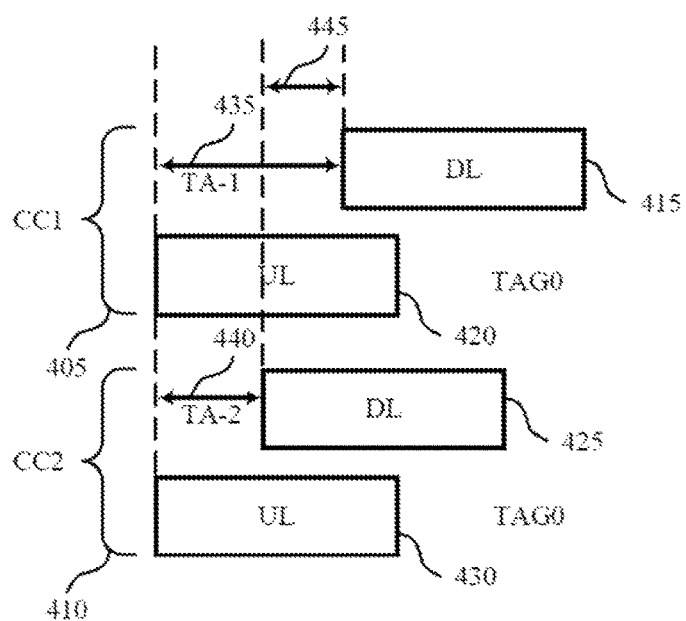
FIG. 4 illustrates another example of timing advances for multiple component carriers that support wireless transmission timing based on timing advance values in shortened transmission time interval transmissions in accordance with aspects of the present disclosure.

FIG. 4 illustrates another example 400 of timing advances for multiple component carriers for wireless transmission timing based on timing advance values in shortened transmission time interval transmissions. Component carriers such as illustrated in FIG. 4 may be used for low latency communications between a UE and a base station such as discussed above with respect to FIGS. 1 and 2. In this example, two CCs may be configured in a same TAG for wireless transmissions between a UE and a base station, namely CC1 405 and CC2 410. CC1 405 may be used for downlink transmission 415 and uplink transmission 420 and may be in TAG0. CC2 410 may be used for downlink transmission 425 and uplink transmission 430 and may also be in TAG0. Each CC 405 and 410 may have a different TA value, namely TA-1 435 for CC1 405 and TA-2 440 for CC2 410, but may have little or no time misalignment. In some cases, a TA value may be based on a time gap between an earliest UL carrier and a latest DL carrier of a CC.

In such examples, if the largest TA value, TA-1 435 across cells, is larger than a maximum misalignment value 445 (e.g., 31 µs), then the total time difference Tdiff may be TA-1 435. If, however, the largest TA value across cells is smaller than the maximum misalignment value 445 (e.g., 31 µs), then Tdiff may be set to the maximum misalignment value 445 (e.g., 31 µs). Thus, to ensure that Tdiff≤Tmax, the following property may be enforced:

max(maximum misalignment value, the largest TA value across cells)≤Tmax.

To ensure that the minimum processing timeline of the UE is always met, the gap between the earliest UL communication and the latest DL communication should be less than or equal to the maximum TA threshold value. Thus, in some cases, a base station may schedule UEs to maintain the above properties. In other cases, the total time difference Tmax may be above the Tmax threshold, and the value of k in the n+k rule may be adjusted. In some cases, enforcing a single TAG across all uplink CCs of a given CG could constrain scheduling at a base station (basically constraining CCs to be transmitted/received at a same location), and multiple TAGs may be allowed per CG, as will be discussed with respect to FIG. 5.

Figure 5A:
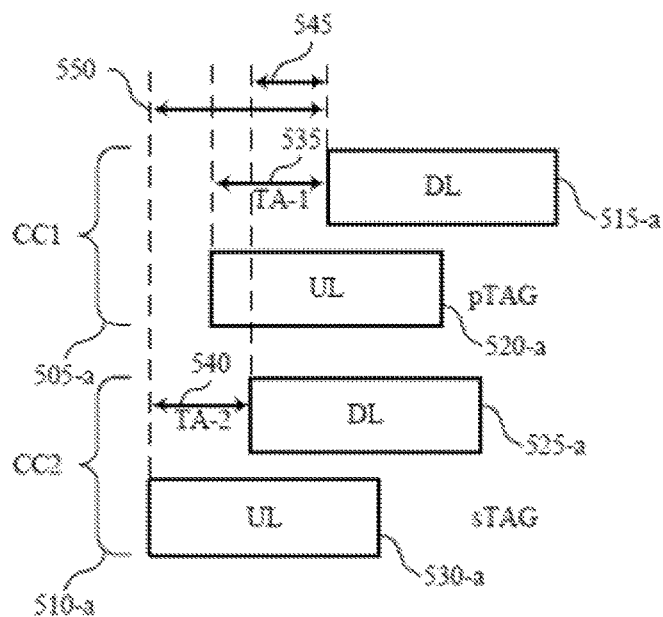
FIGS. 5A and 5B illustrate examples of timing advances in relation to a maximum timing mismatch between component carriers that support wireless transmission timing based on timing advance values in shortened transmission time interval transmissions in accordance with aspects of the present disclosure.
Figure 5B:
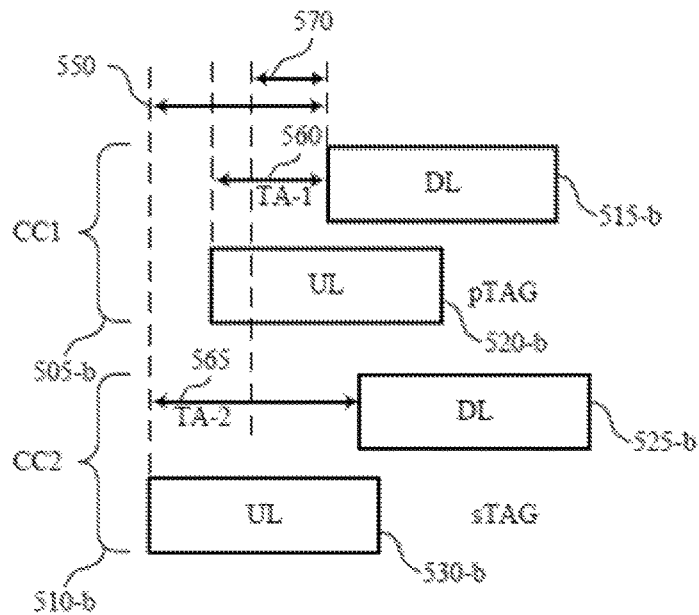

FIGS. 5A and 5B illustrate examples 500 and 550 of timing advances in relation to a maximum timing mismatch between component carriers that support wireless transmission timing based on timing advance values in shortened transmission time interval transmissions. Component carriers such as illustrated in FIG. 5A and FIG. 5B may be used for low latency communications between a UE and a base station such as discussed above with respect to FIGS. 1 and 2. In the example of FIGS. 5A and 5B, two CCs may be configured in a different TAGs for wireless transmissions between a UE and a base station, namely CC1 505 and CC2 510. CC1 505 may be used for downlink transmission 515 and uplink transmission 520 and may be in a pTAG. CC2 510 may be used for downlink transmission 525 and uplink transmission 530 and may be in a sTAG.

In the example of FIG. 5A, each CC 505-a and 510-a may have a different TA value, namely TA-1 535 for CC1 505-a and TA-2 540 for CC2 510-a, and may have a time misalignment 545 that corresponds to a maximum time misalignment between CCs. In this example, it is assumed that TA-2 540 is greater than TA-1 535, and as a result, the total time difference, Tdiff, corresponds to the maximum TA value across cells (TA2) plus the maximum time misalignment (e.g., 31 µs) 545. This single value for Tdiff may be used for all CCs within a CG.

In the example of FIG. 5B, the total time difference, Tdiff 560, may simply be the largest TA value which in this case is TA-2 565 when TA-2 565 is greater than TA-1 560 plus the maximum misalignment value 570. Thus, when multiple TAGs are allowed, the total time difference, Tdiff, depends on the downlink timings and the uplink timings for different CCs, in relation to a maximum time misalignment between the TAGs. In some cases, a base station may not be aware of the exact time misalignment between cells, and may thus assume a worst-case alignment and compare the maximum time difference, Tmax, to a maximum TA value across cells plus the maximum time misalignment. In some cases, a UE may be configured to report TAs to a base station. In such cases, TA reporting may be provided as the maximum TA value for each carrier group, which a base station may use to identify various timing parameters. In some examples, a base station and a UE may be configured to use a first set of timing parameters for uplink and downlink transmissions when Tdiff is less than or equal to Tmax, and may be configured to use a second set of more relaxed timing parameters when Tdiff exceeds Tmax. In other examples, a base station may make scheduling decisions to provide that Tdiff does not exceed Tmax, and may use one or more assumptions for TA values and time misalignment values.

Figure 6:
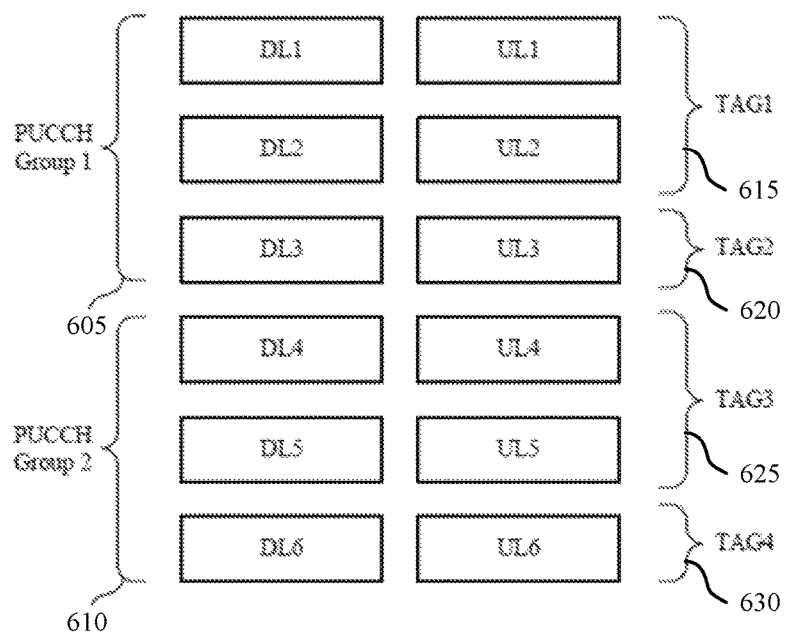
FIG. 6 illustrates an example of different PUCCH groups and different timing advance groups that support wireless transmission timing based on timing advance values in shortened transmission time interval transmissions in accordance with aspects of the present disclosure.

FIG. 6 illustrates an example 600 of different PUCCH groups and different timing advance groups that support wireless transmission timing based on timing advance values in shortened transmission time interval transmissions. Carrier groups such as those illustrated in FIG. 6 may be used for low latency communications between a UE and a base station as discussed above with respect to FIGS. 1 and 2. In the example of FIG. 6, two carrier groups may be configured for wireless transmissions between a UE and a base station, PUCCH group 1 605 and PUCCH group 2 610. PUCCH group 1 may have two TAGs, namely TAG1 615 and TAG2 620, and PUCCH group 2 610 may have two TAGs, namely TAG3 625 and TAG4 630.

When determining TA values for each PUCCH group, the maximum time difference is a function of the TA per PUCCH group and not the per-CC or a per-TAG TA. In some examples, the UE may determine the TA value for each PUCCH group. Accordingly, in the example of FIG. 6, for each PUCCH group, the operations and processing may be managed based on the relative timings across the DL CCs and how the TAGs are configured.

In some examples, one of the parameters that may be adjusted based on the TA values and the TA threshold values may include HARQ timing (e.g., the n+k rule) and/or scheduling for uplink transmissions associated with sTTI transmissions. In some cases, the TA values are determined as a function of across-CC TA values. An across-CC TA value is a TA value that is common to each CC being used in an uplink transmission. In some cases, TA threshold values for across-CC TA values may be sTTI length dependent. For example, the TA threshold value may be set for a 2-symbol sTTI, and no maximum value may be set for a slot sTTI duration or a 1 ms TTI duration, as such relatively longer TTI durations may provide sufficient processing time for UEs to perform processing and still meet the timelines established (e.g., the n+k rule) ULL. In some cases, the TA threshold value may also be dependent upon a category of the UE. For example, MTC-type UEs (e.g., cat-0 or cat-1 UEs) may have lower processing capabilities compared to, for example, a higher capability smartphone UE, and such an MTC-type UE may require additional processing time and thus have different TA threshold values to accommodate for the processing capabilities of the UE. In some cases, TA threshold values may be identified both for single-carrier and multi-carrier operations.

As indicated above, in some cases the across-CC TA values may depend on the PUCCH group configuration and/or TAG configuration for wireless transmissions. TA reporting by a UE, if supported, may also reflect the across-CC TA values. In some cases, the one or more parameters that may be set based on a TA value and a TA threshold value may include, a TBS scaling parameter, a number of layers to support for the wireless transmission, a CQI reporting parameter, HARQ timing (the value of k in n+k rule), UL scheduling timing, or any combination thereof.

In some cases, the TA threshold, Tmax, may be defined to reflect the per-CC operation. If multi-TAG is configured within a given PUCCH group, then the threshold can be added by the maximum timing mismatch between CCs, such as 31 μs. When the actual across-CC TA is greater than the across-CC TA threshold, then the UE may, if TA reporting is enabled, report the per-CC and/or across-CC TA values, or it could be based on the UE implementation. A PUCCH group may be part of CA/DC configuration, for example, and the CCs may include LTE CCs and/or NR CCs.

Figure 7:
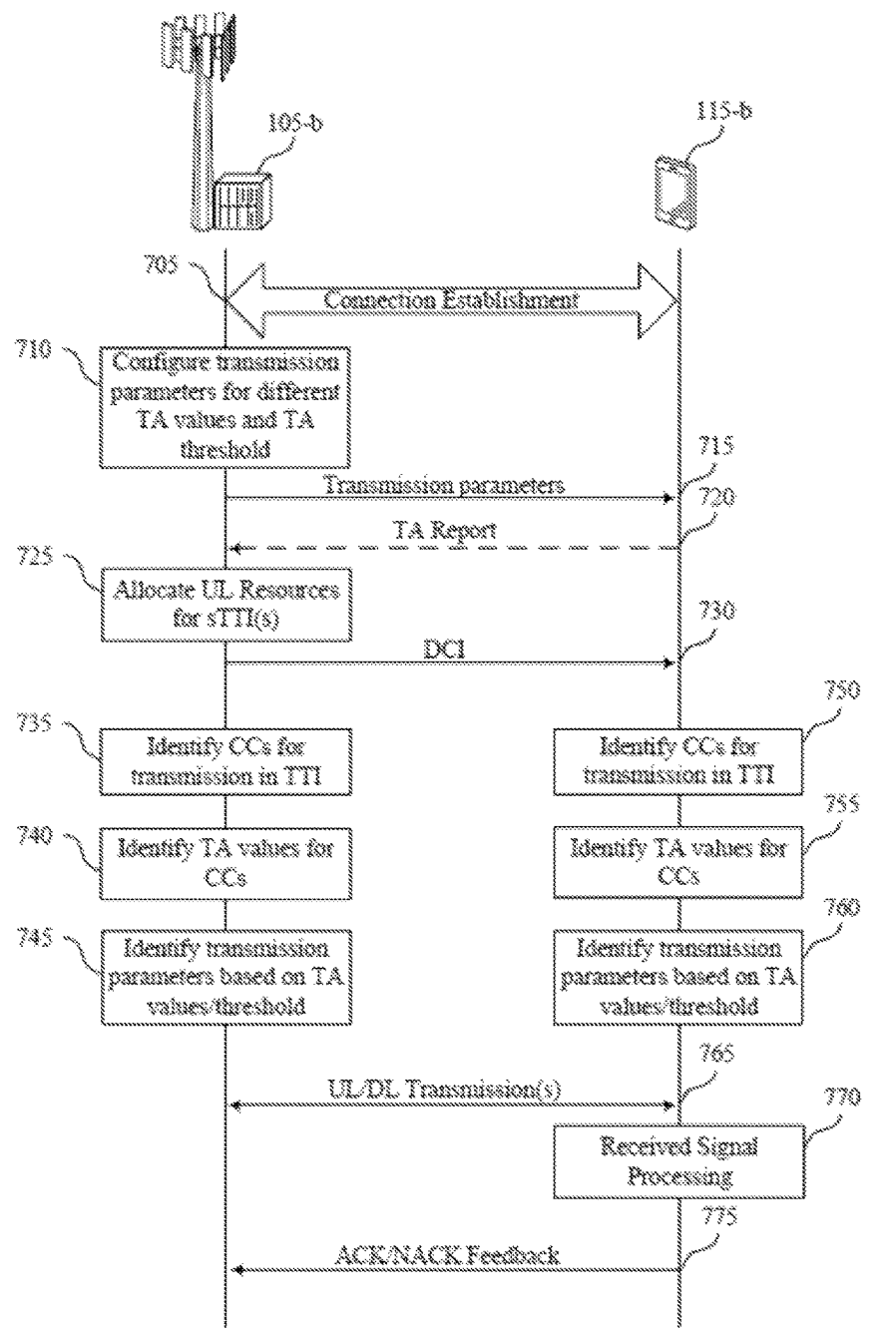
FIG. 7 illustrates an example of a process flow that supports wireless transmission timing based on timing advance values in shortened transmission time interval transmissions in accordance with aspects of the present disclosure.

FIG. 7 illustrates an example of a process flow 700 for wireless transmission timing based on timing advance values in shortened transmission time interval transmissions. Process flow 700 may include a base station 105-b, and a UE 115-b, which may be examples of the corresponding devices described with reference to FIG. 1-2. The base station 105-b and the UE 115-b may establish a connection 705 according to established connection establishment techniques for the wireless communications system.

The base station 105-b may, at block 710, configure transmission parameters for different TA values and a TA threshold value. Such a configuration may be determined based on enabled TTI durations, such as two-symbol sTTI, slot sTTI, or 1 ms TTI. In some examples, a TA threshold value may be configured for two-symbol sTTI transmissions. The base station 105-b may transmit the parameters 715 to the UE 115-b. In some examples, the base station 105-b may configure the UE 115-b with the parameters as part of a connection establishment, or the parameters may be standardized and the UE115-b may determine the parameters based on, for example, sTTI durations. In some cases, the parameters may be selected to provide sufficient processing time at UE 115-b to perform processing within timeframes, such as for timeframes for transmitting ACK/NACK feedback. The UE 115-b may, optionally, transmit a TA report 720 that may include TA values for one or more cells or CCs. In some examples, the TA report 720 may include across-CC values for a TA group, across-CC values based on an one or more of an individual TA for each CC, an uplink time misalignment value for the two or more CCs, a downlink time misalignment value for the two or more CCs, or any combination thereof.

At block 725, base station 105-b may allocate uplink resources for sTTI(s), which may be provided to UE 115-b in downlink control information (DCI) 730. In some cases, the allocated resources may be identified to provide uplink scheduling allocations that accommodate UE processing timelines. In some cases, if a TA value for allocated CCs to the UE exceeds a TA threshold value, the base station 105-b may include an indication to set one or more parameters associated with the resource allocation to provide additional processing time at the UE prior to an associated uplink transmission. In other cases, one or more parameters may be identified at the base station 105-b and the UE 115-b based on the allocated uplink resources.

For example, the base station 105-b, at block 735, may identify CCs for transmission in a TTI. The CCs may be identified as the CCs allocated for uplink transmissions, for example.

The base station 105-b, at block 740, may identify TA values for the identified CCs. As discussed above, such TA values may be identified for a TAG and/or for a CG that is to be used for wireless transmissions. The base station 105-b may identify the TA values based on a TA report provided by the UE 115-b, or may identify the TA values based on one or more initial TA values, such as those provided as part of an access procedure. In some cases, the TA values may, additionally or alternatively, be based on a time misalignment value for the allocated CCs. The TA values may, in some cases, be across-CC TA values for multiple CCs within a CG and/or TAG.

At block 745, the base station 105-*b* may identify transmission parameters based on the TA values and the TA threshold value. In some examples, the transmission parameters may include one or more of a TBS scaling parameter, a number of layers to support for the wireless transmission, a CQI reporting parameter, HARQ timing (the value of k in n+k rule), UL scheduling timing, or any combination thereof. In some examples, identifying the transmission parameters involves determining a maximum number of CCs per PUCCH group.

Similarly, the UE 115-*b* may, at block 750, identify CCs for transmission in a TTI. The CCs may be identified as the CCs allocated for uplink transmissions, for example.

The UE 115-*b*, at block 755, may identify TA values for the identified CCs. As discussed above, such TA values may be identified for a TAG and/or for a CG that is to be used for wireless transmissions. The UE 115-*b* may identify the TA values according to established techniques, such as based on a measurement of propagation delay between the base station 105-*b* and the UE 115-*b*. In some cases, the UE 115-*b* may provide a TA report to the base station 105-*b*. In some cases, the TA values may, additionally or alternatively, be based on a time misalignment value for the allocated CCs. The TA values may, in some cases, be across-CC TA values for multiple CCs within a CG and/or TAG.

At block 760, the UE 115-*b* may identify transmission parameters based on the TA values and the TA threshold value. In some examples, the transmission parameters may include one or more of a TBS scaling parameter, a number of layers to support for the wireless transmission, a CQI reporting parameter, HARQ timing (the value of k in n+k rule), UL scheduling timing, or any combination thereof. In some examples, identifying the transmission parameters involves determining a maximum number of CCs per PUCCH group.

The UE 115-*b* and the base station 105-*b* may transmit uplink and downlink transmissions 765 using the allocated resources on the allocated CCs. The timing for transmissions may be determined, in some cases, based on the TA values and TA threshold values as discussed above. For example, at block 770, the UE 115-*b* may perform received signal processing. Such processing may be, for example, determination of HARQ ACK/NACK feedback or generation of an uplink PUSCH transmission following an uplink grant. The UE 115-*b* may then transmit the associated uplink transmissions, such as a ACK/NACK feedback transmission 775 to the base station 105-*b*.

Figure 8:
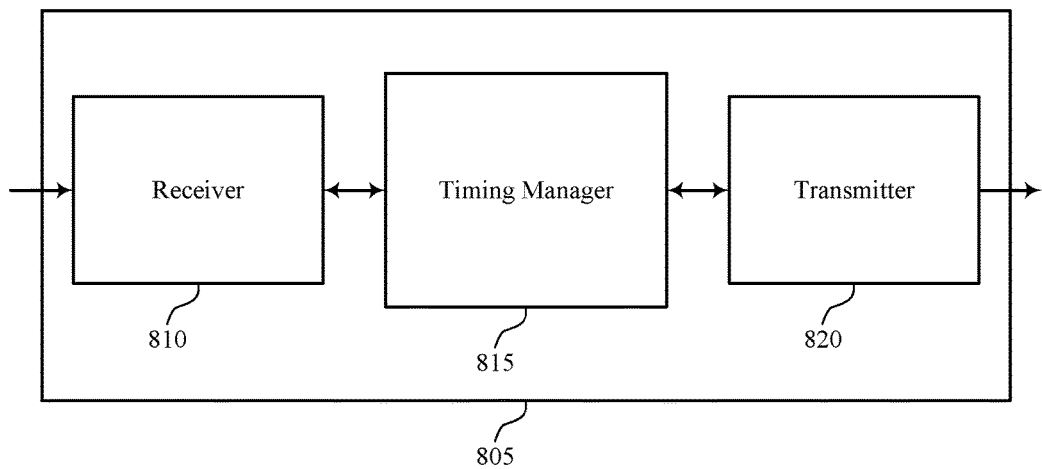
FIGS. 8 through 10 show block diagrams of a device that supports wireless transmission timing based on timing advance values in shortened transmission time interval transmissions in accordance with aspects of the present disclosure.

FIG. 8 shows a block diagram 800 of a wireless device 805 that supports wireless transmission timing based on timing advance values in shortened transmission time interval transmissions in accordance with various aspects of the present disclosure. Wireless device 805 may be an example of aspects of a user equipment (UE) 115 or base station 105 as described with reference to FIG. 1. Wireless device 805 may include receiver 810, timing manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to wireless transmission timing based on timing advance values in shortened transmission time interval transmissions, etc.). Information may be passed on to other components of the device. The receiver 810 may be an example of aspects of the transceiver 1135 described with reference to FIG. 11.

Timing manager 815 may be an example of aspects of the timing manager 1115 described with reference to FIG. 11.

Timing manager 815 and/or at least some of its various sub-components may be implemented in hardware, software executed by a processor, firmware, or any combination thereof. If implemented in software executed by a processor, the functions of the timing manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The timing manager 815 and/or at least some of its various sub-components may be physically located at various positions, including being distributed such that portions of functions are implemented at different physical locations by one or more physical devices. In some examples, timing manager 815 and/or at least some of its various sub-components may be a separate and distinct component in accordance with various aspects of the present disclosure. In other examples, timing manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Timing manager 815 may identify a TA value associated with a wireless transmission, identify a TA threshold value based on a transmission time interval (TTI) of the wireless transmission, and set one or more parameters associated with the wireless transmission based on the TA value and the TA threshold value.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas.

Figure 9:
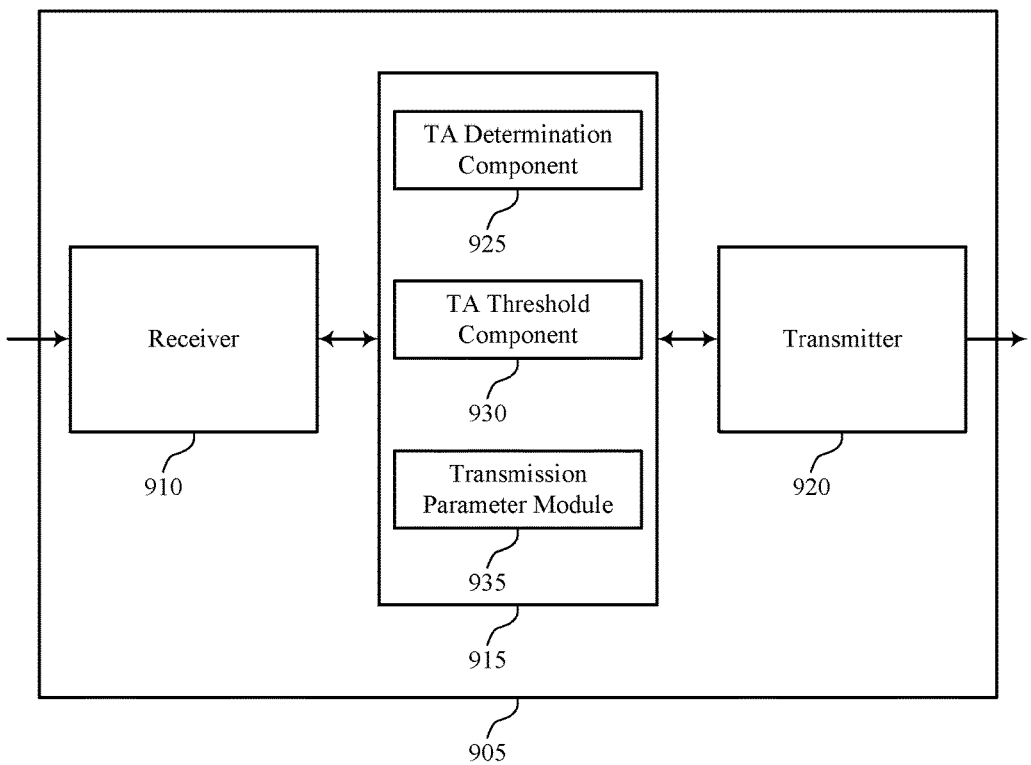

FIG. 9 shows a block diagram 900 of a wireless device 905 that supports wireless transmission timing based on timing advance values in shortened transmission time interval transmissions in accordance with various aspects of the present disclosure. Wireless device 905 may be an example of aspects of a wireless device 805 or a UE 115 or base station 105 as described with reference to FIGS. 1 and 8. Wireless device 905 may include receiver 910, timing manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to wireless transmission timing based on timing advance values in shortened transmission time interval transmissions, etc.). Information may be passed on to other components of the device. The receiver 910 may be an example of aspects of the transceiver 1135 described with reference to FIG. 11.

Timing manager 915 may be an example of aspects of the timing manager 1115 described with reference to FIG. 11. Timing manager 915 may also include TA determination component 925, TA threshold component 930, and transmission parameter module 935.

TA determination component 925 may identify two or more CCs for the wireless transmission, and a TA value common across each of the two or more CCs and is that is based on one or more of an individual TA for each CC, an uplink time misalignment value for the two or more CCs, or a downlink time misalignment value for the two or more CCs. In some cases, a TA threshold value is identified for each of two or more uplink control channel groups of CCs for the wireless transmission.

TA threshold component 930 may identify a TA threshold value based on a TTI of the wireless transmission. In some cases, the TA threshold value is identified for each CC of a set of CCs for the wireless transmission. In some cases, the TA threshold value is identified for each CC of a set of CCs for the wireless transmission, such as CCs of a TAG and/or a CG.

Transmission parameter module 935 may set one or more parameters associated with the wireless transmission based on the TA value and the TA threshold value. In some cases, the one or more parameters include one or more of a hybrid automatic repeat request (HARQ) feedback timing parameter, a transport block size scaling parameter, a number of supported spatial transmission layers, a channel quality information (CQI) type reporting, or a timing for uplink transmission scheduling. In some cases, the set of CCs include one or more Long Term Evolution (LTE) CCs, one or more NR CCs, or combinations thereof. In some cases, a base station may provide the one or more parameters to a user equipment for use when transmitting the wireless transmission. In some cases, a UE may receive the one or more parameters from a base station for use when transmitting the wireless transmission.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
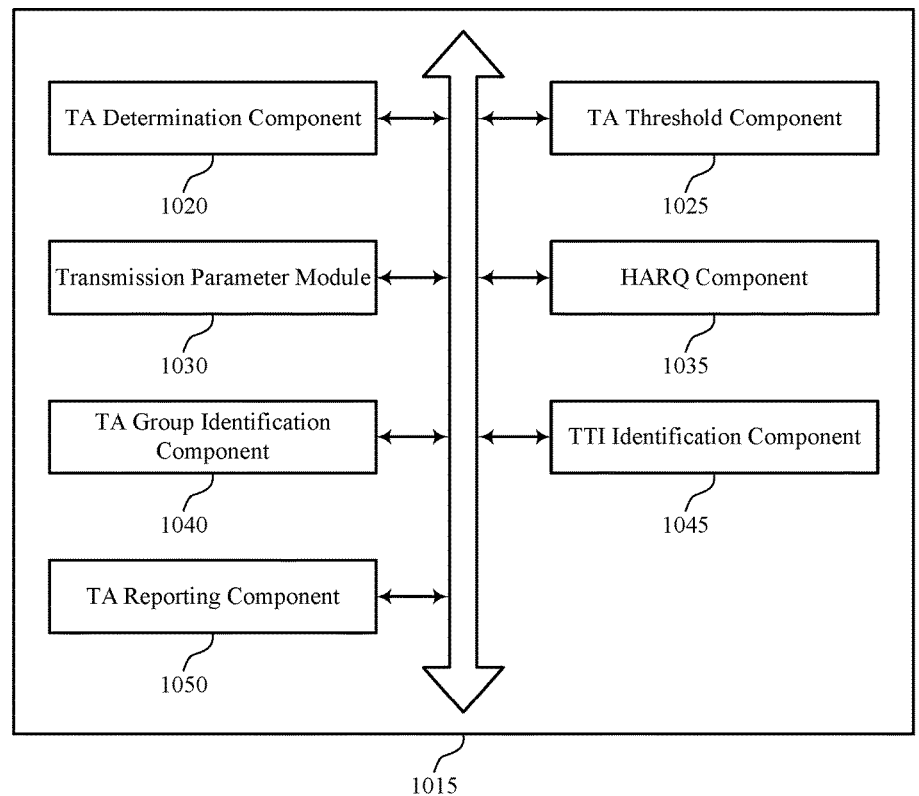

FIG. 10 shows a block diagram 1000 of a timing manager 1015 that supports wireless transmission timing based on timing advance values in shortened transmission time interval transmissions in accordance with various aspects of the present disclosure. The timing manager 1015 may be an example of aspects of a timing manager 815, a timing manager 915, or a timing manager 1115 described with reference to FIGS. 8, 9, and 11. The timing manager 1015 may include TA determination component 1020, TA threshold component 1025, transmission parameter module 1030, HARQ component 1035, TA group identification component 1040, TTI identification component 1045, and TA reporting component 1050. Each of these modules may communicate, directly or indirectly, with one another (e.g., via one or more buses).

TA determination component 1020 may identify two or more CCs for the wireless transmission, and a TA value common across each of the two or more CCs and is based on one or more of an individual TA for each CC, an uplink time misalignment value for the two or more CCs, or a downlink time misalignment value for the two or more CCs.

In some cases, a TA threshold value is identified for each of two or more uplink control channel groups of CCs for the wireless transmission.

TA threshold component 1025 may identify a TA threshold value based on a TTI of the wireless transmission. In some cases, the TA threshold value is identified for each CC of a set of CCs for the wireless transmission. In some cases, the TA threshold value is identified for each CC of a set of CCs for the wireless transmission.

Transmission parameter module 1030 may set one or more parameters associated with the wireless transmission based on the TA value and the TA threshold value. In some cases, the one or more parameters include one or more of a HARQ feedback timing parameter, a transport block size scaling parameter, a number of supported spatial transmission layers, a CQI type reporting, or a timing for uplink transmission scheduling. In some cases, the set of CCs include one or more LTE CCs, one or more NR CCs, or combinations thereof. In some cases, the setting the one or more parameters includes determining a maximum number of component carriers (CCs) per physical uplink control channel (PUCCH) group.

HARQ component 1035 may perform HARQ processing. In some cases, the setting the one or more parameters includes setting a feedback timing for indicating successful reception of a downlink transmission based on the TA value and the TA threshold value. In some cases, the one or more parameters include a HARQ feedback timing parameter that is set based on TA values for two or more component carriers.

TA group identification component 1040 may identify two or more TA groups, and where the TA value includes a TA value for each TA group. In some cases, each group of CCs are part of a carrier aggregation group or a dual-connectivity group.

TTI identification component 1045 may identify a TTI duration for TTIs associated with a wireless transmission. In some cases, the identifying the TA threshold value includes identifying the TA threshold value as a first TA threshold when the TTI of the wireless transmission is a two-symbol TTI, and identifying the TA threshold value as a second TA threshold when the TTI of the wireless transmission is a one-slot TTI or a 1 ms TTI. The second TA threshold may or may not be the same for 1-slot and 1 ms TTIs.

TA reporting component 1050 may report the TA value to a base station, where the TA value corresponds to a TA value based on two or more component carriers for the wireless transmission.

Figure 11:
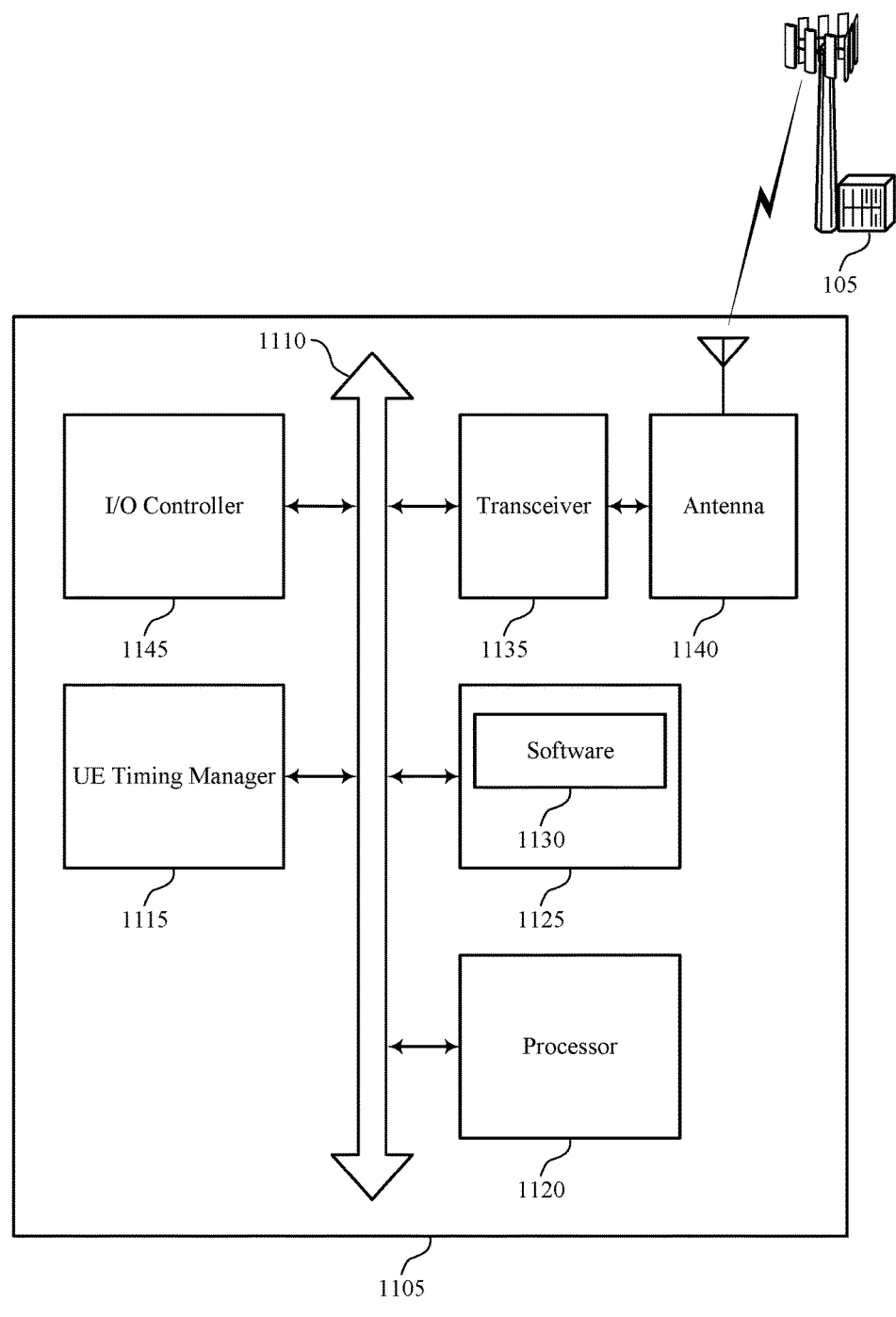
FIG. 11 illustrates a block diagram of a system including a UE that supports wireless transmission timing based on timing advance values in shortened transmission time interval transmissions in accordance with aspects of the present disclosure.

FIG. 11 shows a diagram of a system 1100 including a device 1105 that supports wireless transmission timing based on timing advance values in shortened transmission time interval transmissions in accordance with various aspects of the present disclosure. Device 1105 may be an example of or include the components of wireless device 805, wireless device 905, or a UE 115 as described above, e.g., with reference to FIGS. 1, 8 and 9. Device 1105 may include components for bi-directional voice and data communications including components for transmitting and receiving communications, including UE timing manager 1115, processor 1120, memory 1125, software 1130, transceiver 1135, antenna 1140, and I/O controller 1145. These components may be in electronic communication via one or more busses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting wireless transmission timing based on timing advance values in shortened transmission time interval transmissions).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support wireless transmission timing based on timing advance values in shortened transmission time interval transmissions. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
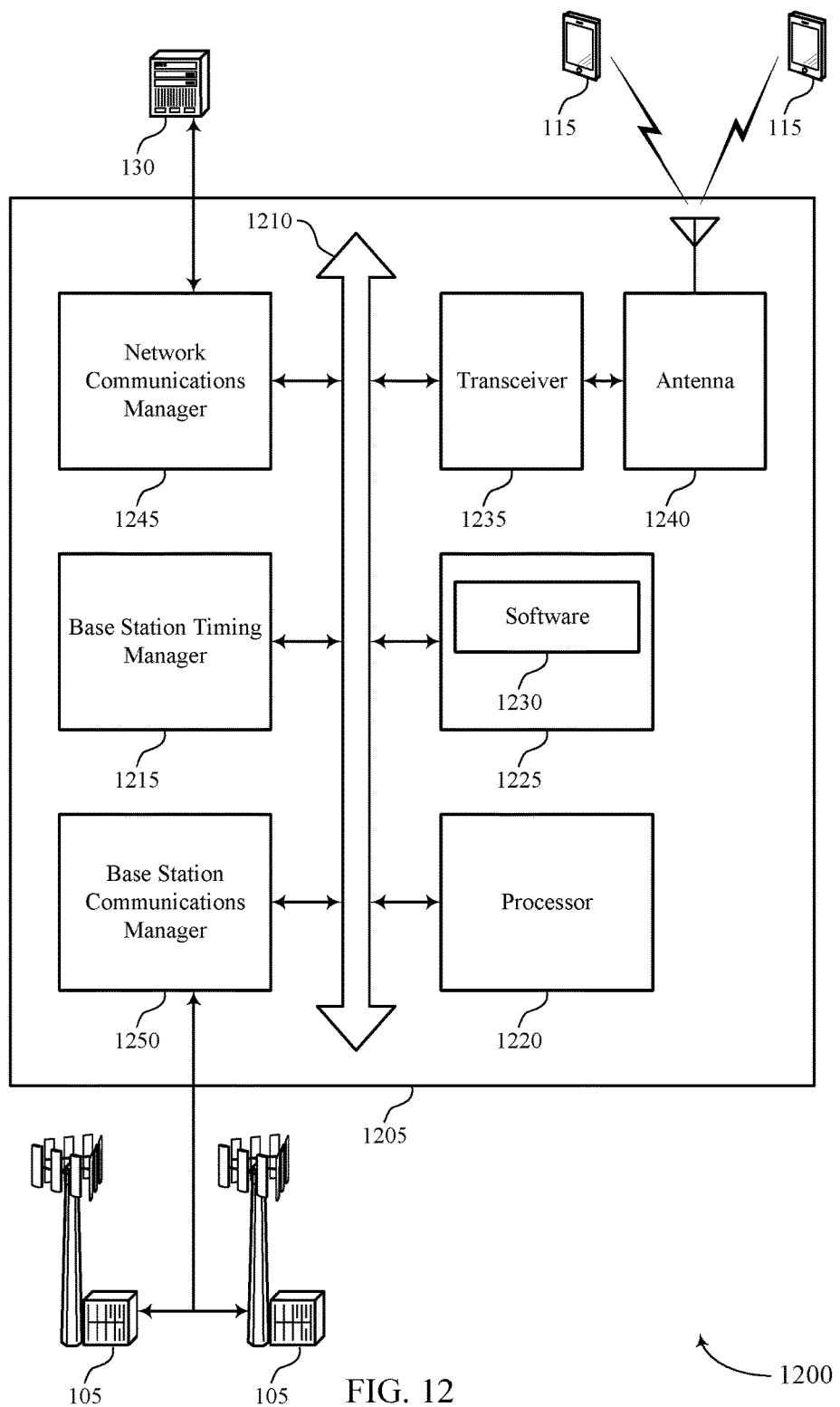
FIG. 12 illustrates a block diagram of a system including a base station that supports wireless transmission timing based on timing advance values in shortened transmission time interval transmissions in accordance with aspects of the present disclosure.

FIG. 12 shows a diagram of a system 1200 including a device 1205 that supports wireless transmission timing based on timing advance values in shortened transmission time interval transmissions in accordance with various aspects of the present disclosure. Device 1205 may be an example of or include the components of wireless device 905, wireless device 1005, or a base station 105 as described above, e.g., with reference to FIGS. 1, 9 and 10. Device 1205 may include components for bi-directional voice and data communications including components for transmitting and receiving communications, including base station timing manager 1215, processor 1220, memory 1225, software 1230, transceiver 1235, antenna 1240, network communications manager 1245, and base station communications manager 1250. These components may be in electronic communication via one or more busses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting wireless transmission timing based on timing advance values in shortened transmission time interval transmissions).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support wireless transmission timing based on timing advance values in shortened transmission time interval transmissions. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Base station communications manager 1250 may manage communications with other base station 105, and may include a controller or scheduler for controlling communications with UEs 115 in cooperation with other base stations 105. For example, the base station communications manager 1250 may coordinate scheduling for transmissions to UEs 115 for various interference mitigation techniques such as beamforming or joint transmission. In some examples, base station communications manager 1250 may provide an X2 interface within an LTE/LTE-A wireless communication network technology to provide communication between base stations 105.

Figure 13:
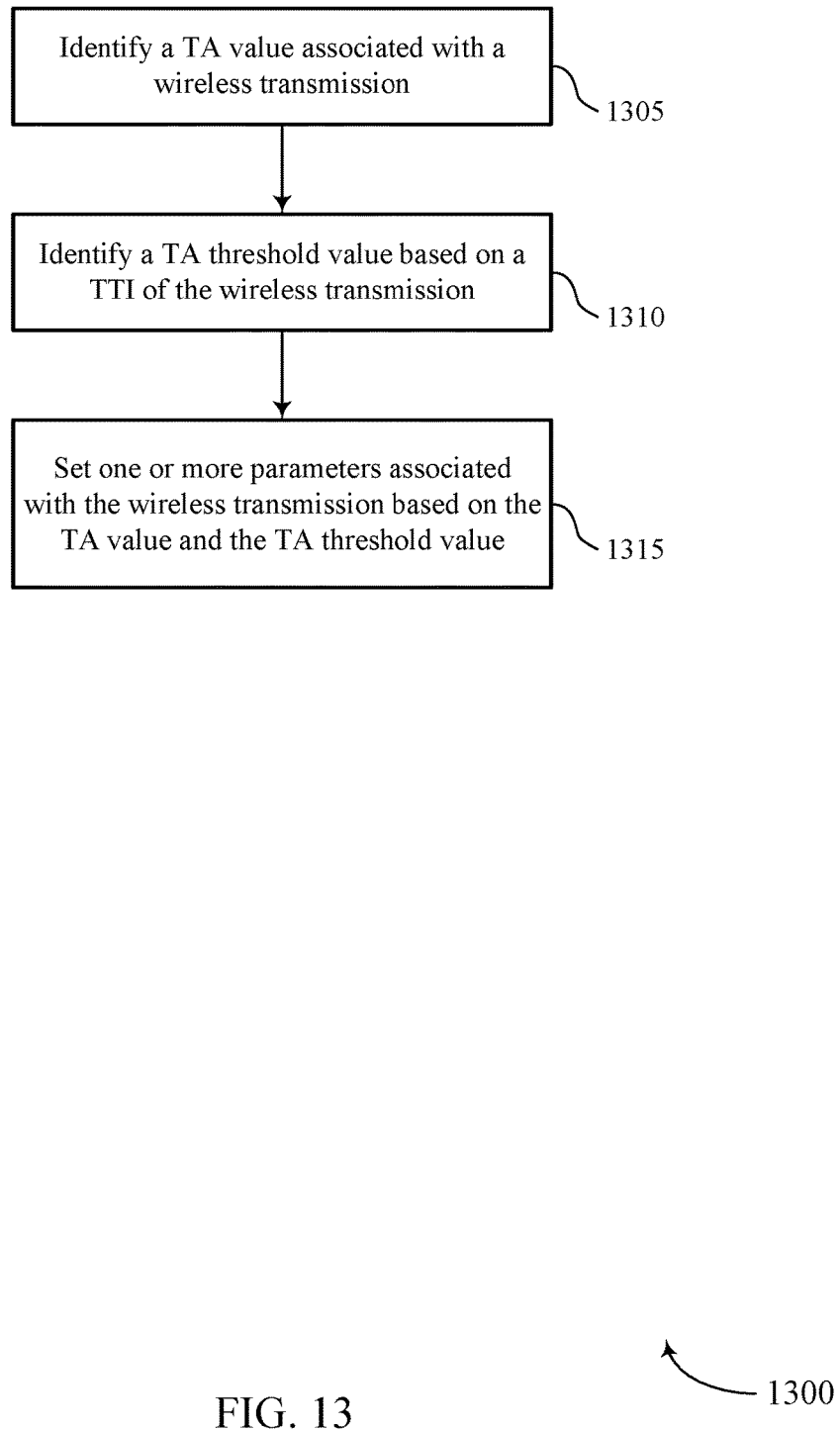
FIGS. 13 through 15 illustrate methods for wireless transmission timing based on timing advance values in shortened transmission time interval transmissions in accordance with aspects of the present disclosure.

FIG. 13 shows a flowchart illustrating a method 1300 for wireless transmission timing based on timing advance values in shortened transmission time interval transmissions in accordance with various aspects of the present disclosure. The operations of method 1300 may be implemented by a UE 115 or base station 105 or its components as described herein. For example, the operations of method 1300 may be performed by a timing manager as described with reference to FIGS. 8 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305 the UE 115 or base station 105 may identify a TA value associated with a wireless transmission. The operations of block 1305 may be performed according to the methods described with reference to FIGS. 1 through 7. In certain examples, aspects of the operations of block 1305 may be performed by a TA determination component as described with reference to FIGS. 8 through 10.

At block 1310 the UE 115 or base station 105 may identify a TA threshold value based at least in part on a TTI of the wireless transmission. The operations of block 1310 may be performed according to the methods described with reference to FIGS. 1 through 7. In certain examples, aspects of the operations of block 1310 may be performed by a TA threshold component as described with reference to FIGS. 8 through 10.

At block 1315 the UE 115 or base station 105 may set one or more parameters associated with the wireless transmission based at least in part on the TA value and the TA threshold value. The operations of block 1315 may be performed according to the methods described with reference to FIGS. 1 through 7. In certain examples, aspects of the operations of block 1315 may be performed by a transmission parameter module as described with reference to FIGS. 8 through 10.

Figure 14:
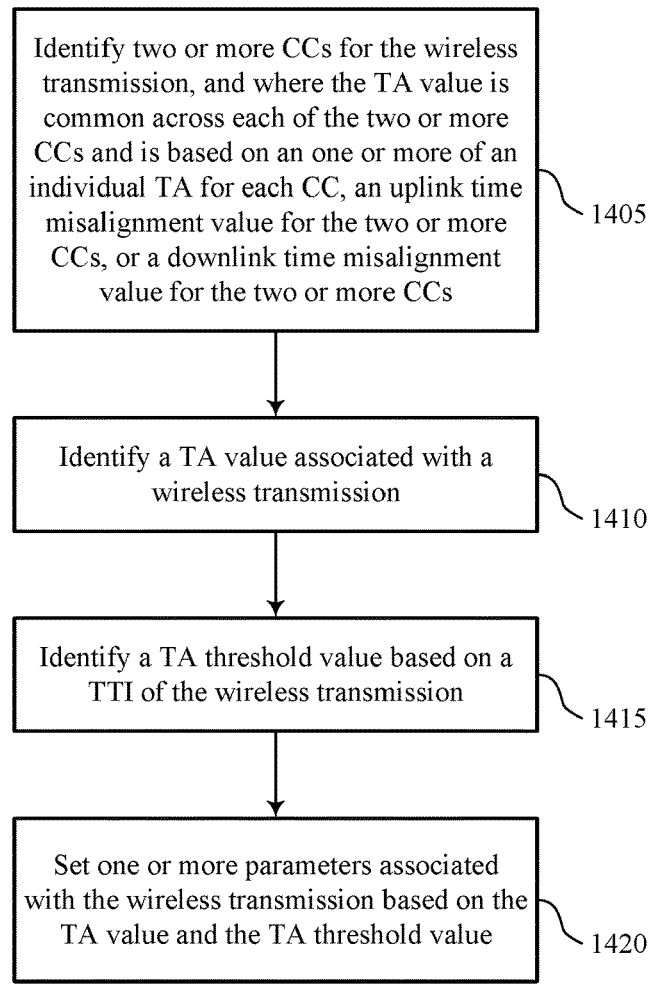

FIG. 14 shows a flowchart illustrating a method 1400 for wireless transmission timing based on timing advance values in shortened transmission time interval transmissions in accordance with various aspects of the present disclosure. The operations of method 1400 may be implemented by a UE 115 or base station 105 or its components as described herein. For example, the operations of method 1400 may be performed by a timing manager as described with reference to FIGS. 8 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1405 the UE 115 or base station 105 may identify two or more CCs for the wireless transmission, where the TA value is common across each of the two or more CCs and is based on one or more of an individual TA for each CC, an uplink time misalignment value for the two or more CCs, or a downlink time misalignment value for the two or more CCs. In some cases, the two or more CCs may belong to the same timing advance group. The operations of block 1405 may be performed according to the methods described with reference to FIGS. 1 through 7. In certain examples, aspects of the operations of block 1405 may be performed by a TA determination component as described with reference to FIGS. 8 through 10.

At block 1410 the UE 115 or base station 105 may identify a TA value associated with a wireless transmission. The operations of block 1410 may be performed according to the methods described with reference to FIGS. 1 through 7. In certain examples, aspects of the operations of block 1410 may be performed by a TA determination component as described with reference to FIGS. 8 through 10.

At block 1415 the UE 115 or base station 105 may identify a TA threshold value based at least in part on a TTI of the wireless transmission. The operations of block 1415 may be performed according to the methods described with reference to FIGS. 1 through 7. In certain examples, aspects of the operations of block 1415 may be performed by a TA threshold component as described with reference to FIGS. 8 through 10.

At block 1420 the UE 115 or base station 105 may set one or more parameters associated with the wireless transmission based at least in part on the TA value and the TA threshold value. The operations of block 1420 may be performed according to the methods described with reference to FIGS. 1 through 7. In certain examples, aspects of the operations of block 1420 may be performed by a transmission parameter module as described with reference to FIGS. 8 through 10.

Figure 15:
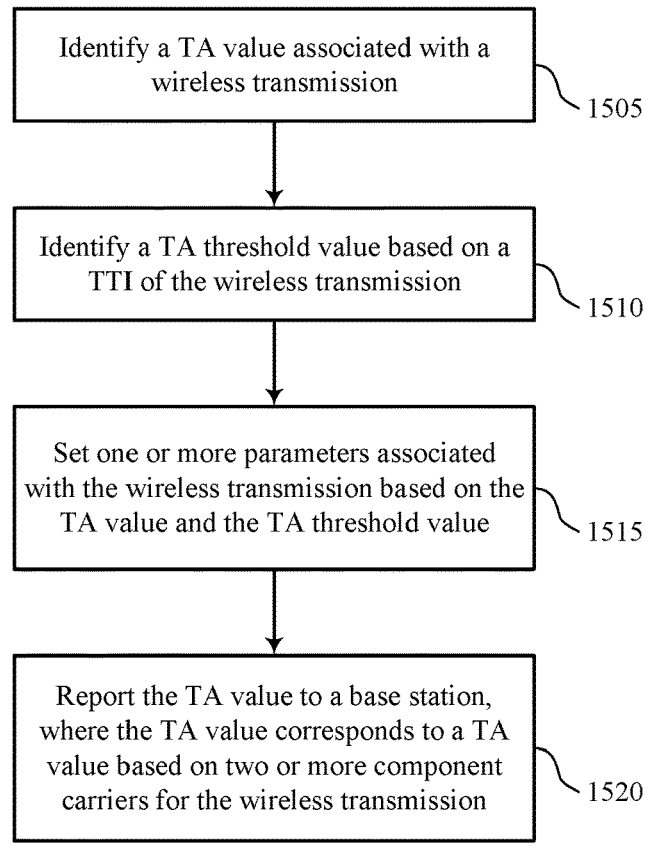

FIG. 15 shows a flowchart illustrating a method 1500 for wireless transmission timing based on timing advance values in shortened transmission time interval transmissions in accordance with various aspects of the present disclosure. The operations of method 1500 may be implemented by a UE 115 or base station 105 or its components as described herein. For example, the operations of method 1500 may be performed by a timing manager as described with reference to FIGS. 8 through 10. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1505 the UE 115 or base station 105 may identify a TA value associated with a wireless transmission. The operations of block 1505 may be performed according to the methods described with reference to FIGS. 1 through 7. In certain examples, aspects of the operations of block 1505 may be performed by a TA determination component as described with reference to FIGS. 8 through 10.

At block 1510 the UE 115 or base station 105 may identify a TA threshold value based at least in part on a TTI of the wireless transmission. The operations of block 1510 may be performed according to the methods described with reference to FIGS. 1 through 7. In certain examples, aspects of the operations of block 1510 may be performed by a TA threshold component as described with reference to FIGS. 8 through 10.

At block 1515 the UE 115 or base station 105 may set one or more parameters associated with the wireless transmission based at least in part on the TA value and the TA threshold value. The operations of block 1515 may be performed according to the methods described with reference to FIGS. 1 through 7. In certain examples, aspects of the operations of block 1515 may be performed by a transmission parameter module as described with reference to FIGS. 8 through 10.

At block 1520 the UE 115 or base station 105 may report the TA value to a base station, wherein the TA value corresponds to a TA value based on two or more component carriers for the wireless transmission. The operations of block 1520 may be performed according to the methods described with reference to FIGS. 1 through 7. In certain examples, aspects of the operations of block 1520 may be performed by a TA reporting component as described with reference to FIGS. 8 through 10.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a timing advance (TA) value associated with a wireless transmission;
identifying a TA threshold value based at least in part on a transmission time interval (TTI) of the wireless transmission, wherein the TA threshold value is associated with a processing time related to feedback information associated with the wireless transmission;
setting one or more parameters associated with the wireless transmission based at least in part on the TA value and the TA threshold value; and
transmitting, by a wireless transceiver, one or more signals in accordance with the one or more parameters associated with the wireless transmission.

2. The method of claim 1, further comprising:
identifying two or more component carriers (CCs) for the wireless transmission, and wherein the TA value is common across each of the two or more CCs and is based on one or more of an individual TA for each CC, an uplink time misalignment value for the two or more CCs, or a downlink time misalignment value for the two or more CCs.

3. The method of claim 1, wherein:
the setting the one or more parameters comprises setting a feedback timing parameter that indicates successful reception of a downlink transmission based at least in part on the TA value and the TA threshold value.

4. The method of claim 1, further comprising:
identifying two or more TA groups, and wherein the TA value comprises a TA value for each TA group.

5. The method of claim 1, wherein:
the identifying the TA threshold value comprises identifying the TA threshold value as a first TA threshold when the TTI of the wireless transmission is a two-symbol TTI, and identifying the TA threshold value as a second TA threshold when the TTI of the wireless transmission is a one-slot TTI or a 1 ms TTI.

6. The method of claim 1, wherein:
the one or more parameters comprise a hybrid acknowledgement repeat request (HARQ) feedback timing parameter that is set based at least in part on TA values for two or more component carriers.

7. The method of claim 1, further comprising:
reporting the TA value to a base station, wherein the TA value corresponds to a TA value based on two or more component carriers for the wireless transmission.

8. The method of claim 7, wherein:
the TA threshold value is identified for each component carrier (CC) of a plurality of CCs for the wireless transmission.

9. The method of claim 1, wherein:
the one or more parameters comprise one or more of a hybrid acknowledgement repeat request (HARQ) feedback timing parameter, a transport block size scaling parameter, a number of supported spatial transmission layers, a channel quality information (CQI) type reporting, or a timing for uplink transmission scheduling.

10. The method of claim 1, wherein:
the setting the one or more parameters comprises determining a maximum number of component carriers (CCs) per physical uplink control channel (PUCCH) group.

11. The method of claim 1, wherein:
the TA value is based at least in part on a time gap between an earliest uplink carrier and a latest downlink carrier of a component carrier.

12. The method of claim 11, wherein:
the time gap is less than the TA threshold value.

13. The method of claim 1, wherein:
the TA threshold value is identified for each component carrier (CC) of a plurality of CCs for the wireless transmission.

14. The method of claim 13, wherein:
the plurality of CCs comprise one or more Long Term Evolution (LTE) CCs, one or more next generation new radio (NR) CCs, or combinations thereof.

15. The method of claim 1, wherein:
the TA threshold value is identified for each of two or more uplink control channel groups of component carriers (CCs) for the wireless transmission.

16. The method of claim 15, wherein:
each of the two or more uplink control channel groups CCs are part of a carrier aggregation or a dual-connectivity operation.

17. The method of claim 1, wherein:
the method is performed by a base station, and wherein transmitting the one or more signals in accordance with the one or more parameters associated with the wireless transmission further comprises transmitting the one or more parameters to a user equipment.

18. The method of claim 1, wherein:
the method is performed by a user equipment (UE), and wherein transmitting the one or more signals in accordance with the one or more parameters associated with the wireless transmission further comprises transmitting the wireless transmission using the one or more parameters, the method further comprising:
receiving, by the wireless transceiver, the one or more parameters from a base station.

19. An apparatus for wireless communication, comprising:

means for identifying a timing advance (TA) value associated with a wireless transmission;
means for identifying a TA threshold value based at least in part on a transmission time interval (TTI) of the wireless transmission, wherein the TA threshold value is associated with a processing time related to feedback information associated with the wireless transmission;
means for setting one or more parameters associated with the wireless transmission based at least in part on the TA value and the TA threshold value; and
means for transmitting one or more signals in accordance with the one or more parameters associated with the wireless transmission.

20. An apparatus for wireless communication, in a system comprising:
a processor;
memory coupled with the processor; and
instructions stored in the memory and operable, when executed by the processor, to cause the apparatus to:
identify a timing advance (TA) value associated with a wireless transmission;
identify a TA threshold value based at least in part on a transmission time interval (TTI) of the wireless transmission, wherein the TA threshold value is associated with a processing time related to feedback information associated with the wireless transmission;
set one or more parameters associated with the wireless transmission based at least in part on the TA value and the TA threshold value;
transmit, by a wireless transceiver, one or more signals in accordance with the one or more parameters associated with the wireless transmission.

21. The apparatus of claim 20, wherein the instructions are operable to cause the processor to:
identify two or more component carriers (CCs) for the wireless transmission, and wherein the TA value is common across each of the two or more CCs and is based on one or more of an individual TA for each CC, an uplink time misalignment value for the two or more CCs, or a downlink time misalignment value for the two or more CCs.

22. The apparatus of claim 20, wherein the instructions operable to cause the apparatus to set the one or more parameters comprise instructions operable to cause the apparatus to:
set a feedback timing parameter that indicates successful reception of a downlink transmission based at least in part on the TA value and the TA threshold value.

23. The apparatus of claim 20, wherein the instructions are operable to cause the processor to:
identify two or more TA groups, and wherein the TA value comprises a TA value for each TA group.

24. The apparatus of claim 20, wherein the instructions operable to cause the apparatus to identify the TA threshold value comprise instructions operable to cause the apparatus to:
identify the TA threshold value as a first TA threshold when the TTI of the wireless transmission is a two-symbol TTI, and identifying the TA threshold value as a second TA threshold when the TTI of the wireless transmission is a one-slot TTI or a 1 ms TTI.

25. The apparatus of claim 20, wherein the one or more parameters comprise a hybrid acknowledgement repeat request (HARQ) feedback timing parameter that is set based at least in part on TA values for two or more component carriers.

26. The apparatus of claim 20, wherein the instructions are operable to cause the processor to:
  report the TA value to a base station, wherein the TA value corresponds to a TA value based on two or more component carriers for the wireless transmission.

27. The apparatus of claim 26, wherein the TA threshold value is identified for each component carrier (CC) of a plurality of CCs for the wireless transmission.

28. The apparatus of claim 20, wherein the one or more parameters comprise one or more of a hybrid acknowledgement repeat request (HARQ) feedback timing parameter, a transport block size scaling parameter, a number of supported spatial transmission layers, a channel quality information (CQI) type reporting, or a timing for uplink transmission scheduling.

29. The apparatus of claim 20, wherein the instructions operable to cause the apparatus to set the one or more parameters comprise instructions operable to cause the apparatus to:
  determine a maximum number of component carriers (CCs) per physical uplink control channel (PUCCH) group.

30. The apparatus of claim 20, wherein:
  the TA value is based at least in part on a time gap between an earliest uplink carrier and a latest downlink carrier of a component carrier.

31. The apparatus of claim 30, wherein:
  the time gap is less than the TA threshold value.

32. The apparatus of claim 20, wherein the TA threshold value is identified for each component carrier (CC) of a plurality of CCs for the wireless transmission.

33. The apparatus of claim 32, wherein the plurality of CCs comprise one or more LTE CCs, one or more NR CCs, or combinations thereof.

34. The apparatus of claim 20, wherein the TA threshold value is identified for each of two or more uplink control channel groups of component carriers (CCs) for the wireless transmission.

35. The apparatus of claim 34, wherein each of the two or more uplink control channel groups are part of a carrier aggregation or a dual-connectivity operation.

36. The apparatus of claim 20, wherein the apparatus is a base station, and wherein the instructions operable to cause the apparatus to transmit the one or more signals in accordance with the one or more parameters associated with the wireless transmission comprise instructions operable to cause the apparatus to:
  transmit, by the wireless transceiver, the one or more parameters to a user equipment for use when transmitting the wireless transmission.

37. The apparatus of claim 20, wherein the apparatus is a user equipment (UE), and wherein the instructions operable to cause the apparatus to transmit the one or more signals in accordance with the one or more parameters associated with the wireless transmission comprise instructions operable to cause the apparatus to transmit the wireless transmission using the one or more parameters, and the instructions are operable to cause the apparatus to:
  receive, at the wireless transceiver, the one or more parameters from a base station.

38. A non-transitory computer readable medium storing code for wireless communication, the code comprising instructions executable by a processor to:
  identify a timing advance (TA) value associated with a wireless transmission;
  identify a TA threshold value based at least in part on a transmission time interval (TTI) of the wireless transmission, wherein the TA threshold value is associated with a processing time for generating feedback information associated with the wireless transmission;
  set one or more parameters associated with the wireless transmission based at least in part on the TA value and the TA threshold value; and
  transmit, by a wireless transceiver, one or more signals in accordance with the one or more parameters associated with the wireless transmission.

* * * * *